Oct. 14, 1941.   H. C. DRAKE   2,258,748
TUBE TESTER
Filed Nov. 5, 1940   2 Sheets-Sheet 1
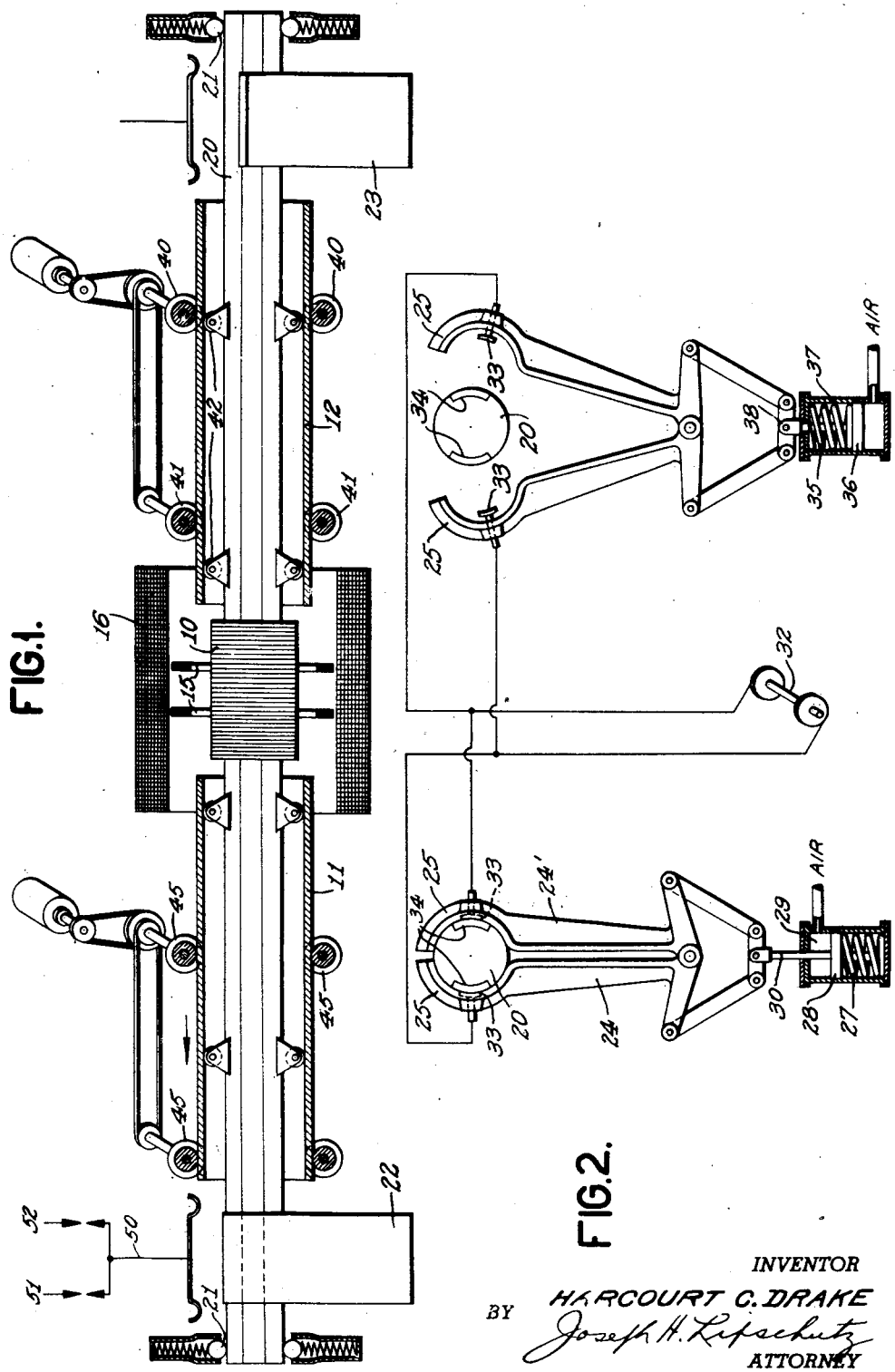
INVENTOR
HARCOURT C. DRAKE
BY Joseph H. Lipschutz
ATTORNEY Oct. 14, 1941.　　　H. C. DRAKE　　　2,258,748
TUBE TESTER
Filed Nov. 5, 1940　　　2 Sheets-Sheet 2

INVENTOR
HARCOURT C. DRAKE
BY Joseph H. Lipschutz
ATTORNEY

Patented Oct. 14, 1941

2,258,748

UNITED STATES PATENT OFFICE 2,258,748

TUBE TESTER

Harcourt C. Drake, Hempstead, N. Y., assignor to Sperry Products, Inc., Hoboken, N. J., a corporation of New York Application November 5, 1940, Serial No. 364,383

9 Claims. (Cl. 175—183)

This invention relates to tube testers which are designed to discover internal flaws within the tube structure by non-destructive methods. The invention is particularly designed to be used in connection with the type of tube tester shown in the patent to Archibald H. Davis, Jr., No. 2,065,118, granted Dec. 22, 1936, in which the energizing coil is inside the tube under test. The tube is surrounded by another coil for saturating the tube with magnetism in order to wipe out the magnetic effects within the coil, and surrounding the periphery of the tube there are one or more detector coils for detecting variations in flux caused by the presence of fissures. The energizing coil is supported within the tube under test by a long tube which engages one end of the coil and through which power is led to the terminals of the exciting coil. An arrangement of this type does not lend itself readily to production testing because the tube under test is passed along over the exciting coil for the entire length of said tube and is then withdrawn from the same end of the machine because of the method of supporting the exciting coil and the connections to said support previously mentioned. This means a loss of time and also stopping and reversing the roll mechanism which is utilized to move the tube along relative to the exciter coil. In other words, it is not possible to move the tube under test completely through the testing machine in one direction only with no withdrawal or backward movement of the tube. It is obvious that if the tube under test could be sent through the machine in one direction only, it could be followed closely by a second tube and continuous testing without loss of time for retracting the tube and reversing the rolling mechanism would be possible.

It is the principal object of my invention, therefore, to provide a mechanism whereby continuous testing of tubes by means of an inner exciting coil is achieved.

Further objects and advantages of this invention will become apparent in the following detailed description thereof.

In the accompanying drawings,

Fig. 1 is a front elevation, partly sectioned vertically, and with parts broken away, showing one embodiment of my invention.

Fig. 2 is a view partly diagrammatic, showing the clamps in end elevation and the electrical connections thereto.

Figure 3:
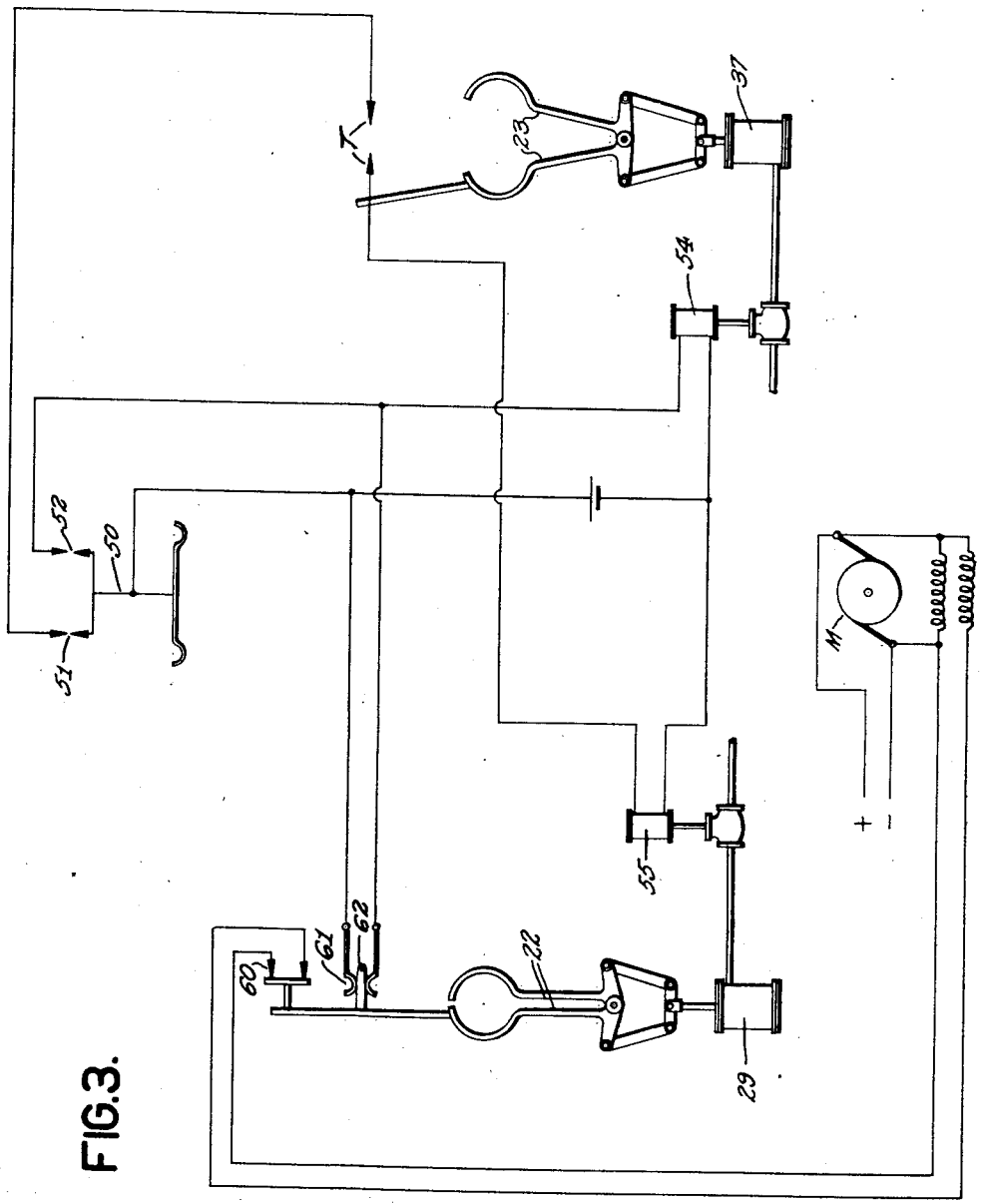
Fig. 3 is a wiring diagram showing additional electrical connections to the mechanism of Fig. 1.

Referring to Fig. 1, it will be seen that I have provided the fundamental elements of tube testing by the method disclosed in the said patent to Davis No. 2,065,118, consisting in an exciting coil 10 adapted to operate inside of tubes such as 11 and 12 to be tested, in order to supply energizing flux to the walls of said tubes. Variations in flux in the walls of said tubes set up by defects may be detected by means of induction coils 15 which may be of the circumferential type. In order that magnetic variations in the material shall not affect the test, a magnetizing coil 16 may be employed surrounding the tubes under test and carrying sufficient magnetism to saturate the walls of the tubes. It will be understood that as the tube is passed over the energizing coil 10 past the relatively fixed detector coils 15 and magnetizing coil 16, any defects in the tube which will cause distortion in the flux distribution within said tube will affect the coils 15 differentially to generate an E. M. F. which, after being suitably amplified, may be caused to operate any desired indicator. This method of testing is now well known in principle.

The problem arises when it is desired to test tubes continuously on a production basis. It will be seen that if the exciting coil is to be supported in the manner disclosed in the said patent to Davis, then the tube must be passed over said exciting coil in one direction for the entire length of said tube and then withdrawn prior to passing a second tube over the exciter coil. Not only is time lost in thus retracting the tube before a second tube may be tested, but especially in the larger arrangements for testing tubes 8" to 16" in diameter, sets of power driven rollers are employed for moving said tubes over the exciting coil, and these rollers must be reversed in direction in order to withdraw the tubes after testing.

The following arrangement will enable tubes to be tested on a production basis by reason of the fact that said tubes may be moved in one direction only past the exciter coil and the said exciter coil is nevertheless properly supported and receives current supply without, however, having said supporting means and electrical connections interfere in any way with the continuous passage of the tubes and without the necessity of withdrawing the same. For this purpose I have provided a supporting shaft 20 adapted to be supported at its ends between sets of spring pressed rollers or trolleys 21, and the other means which will be described hereinafter. Adjacent said trolleys 21, at each end thereof, there may be provided current clamps 22 and 23 which may take the form shown in Fig. 2 and comprise a pair of hinged jaws 24 and 24' carrying at their upper ends arcuate members 25 adapted to engage the shaft 20 in the closed position of said jaws. Normally, the jaws of clamp 22 are closed to engage shaft 20, the said jaws being drawn together by means of a spring 27 pressing upon a piston 28 in a cylinder 29, said piston having a rod 30 pivoted to one of the jaw members and the cylinder 29 resting against the other jaw member so that the spring normally draws said jaws together. Current is supplied to the jaws 25 of clamps 22 and 23 from a source of alternating current 32 which will supply the necessary current to the exciting coil 10. The jaws 25 may be provided with spring-pressed contacts 33 adapted to make contact with current-carrying bars 34 set in said shaft, which then carry the current to the exciter coil 10. The jaws of clamps 23 are normally open by reason of a spring 35 acting against a piston 36 within a cylinder 37, said piston having a rod 38 engaging one of the clamp members, while the cylinder 37 engages the other jaw member. The parts are arranged opposite to those shown within cylinder 29 so that the spring normally keeps the clamp 23 open.

The above is the condition of the parts when a tube is fed through the trolleys 21, through the open jaws of clamp 23, past a set of rollers 40 and a second set of rollers 41, said rollers being power driven in a direction to feed the tube 12 over the exciting coil 10. Guide rollers 42 may be provided on shaft 20 to keep the tube 12 properly spaced. The rollers 40 and 41 drive the tube 12 past the exciting coil 10 and the detector coils 15 and saturating magnet coil 16, and during said passage the tube is tested. It then passes beyond the testing position and engages power rollers 45 which take hold of the tube before it has left the rollers 41 to feed the same outwardly toward clamp 22.

If continuous testing of tubes without the necessity for withdrawal is to be effected, then the tube 12 which is now in the position of tube 11 must somehow get past the clamp 22, but in so doing the electrical connection between the clamp and the shaft 20, and hence the energization of the exciter coil 10, will be broken. Therefore I have provided means whereby when the tube in position 11 approaches clamp 22, means are provided for closing clamp 23 and thus continuing the energization of the exciter coil 10. The dimensions of the parts are such that when one tube such as 11 has been tested and is approaching clamp 22, the next tube 12 will have passed completely through clamp 23 and its inner end will be in a position approaching but not having reached exciter coil 10. It will be seen that the parts are now in such position that clamp 23 may close and clamp 22 may open without interfering with the progress of the tubes through the machine and without disconnecting the exciter coil 10 while a tube is in position thereover. In other words, the entire change-over can now take place without interrupting the testing process.

For changing from the connections between clamp 22 and the exciter coil to a connection between clamp 23 and the exciter coil, I provide for a switch 50 adapted to be engaged by the travel of the tested tube 11 to close contacts 51 and 52 and (see Fig. 3) energize an air valve 54 controlling the passage of air into cylinder 37 to operate piston 36 against the action of spring 35 and close the jaws of clamp 23. Electrical contact will now be made between clamp 23 and shaft 20 and hence between the source of current 32 and exciter coil 10. The exciter coil is now ready to test a succeeding tube 12 as it moves thereover. At the same time, as soon as switch 50 is actuated and contacts T have closed, (thus ensuring that clamp 23 is closed) the solenoid-operated valve 55 is operated to admit compressed air into cylinder 29 to move the piston 28 against the action of spring 27 and open the jaws of clamp 22 to permit the tested tube 11 to pass therethrough and through the supporting rollers 21 and out of the machine. The solenoid valve 55 is operated from a switch 61 which is closed when the clamp 22 opens, the said opening of the clamp withdrawing a strip of insulation 62 from between the switch points 61 to permit the same to close. When the tested tube has passed completely through the machine, the switch 50 will drop to open contacts 51 and 52 and de-energize valve 55 to permit spring 27 to close the jaws of clamp 22. When insulation strip 62 has opened contacts 61 (thus ensuring that clamp 22 has closed), the circuit through valve 54 is opened to permit spring 35 to open the jaws of clamp 23.

In order that the next tube following tube 12 may be introduced with the minimum loss of time, it is necessary to reestablish contact of clamp 22 and open clamp 23. If tube 11 is withdrawn from the machine at the same rate that tube 12 is fed over the exciting coil, then it will be seen that clamp 22 would have to be open until the entire tube 12 had passed over the exciter coil. This would leave too big a gap before the next tube could be sent into the machine. Therefore, means are provided whereby, when the clamp 22 is opened, the movement of rollers 45 is speeded up so that tube 11 is ejected from the machine much more quickly than tube 12 is fed over the exciter coil. For this purpose, when switch 50 is actuated by tube 11 to open clamp 22, the said opening of the clamp is caused to open switch 60 which reduces the field of the driving motor which operates the rollers 45. This causes the motor to speed up and eject the tube 11 at an increased speed. When switch 50 opens, switch 60 closes to reduce the field of motor M and reduce the speed of running of said motor and hence the speed of rollers 45. As soon as tube 11 has been ejected, clamp 22 closes. In the final closing movement of clamp 22, insulation strip 62 opens contacts 61, thus breaking the circuit through solenoid 54 and permitting spring 35 to open clamp 23. The next tube to be tested may be inserted in the machine while tube 12 is still passing the test coils.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means, means whereby each of said contact means may be connected to said shaft for supplying current from a source of electrical energy to said coil and may be disconnected from said shaft to permit a tube to be passed over said shaft, and means whereby certain of said contact means are rendered effective to energize said coil when certain other of said contact means are rendered ineffective so as to permit a tube to be passed over said shaft.

2. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means, means whereby each of said contact means may be connected to said shaft for supplying current from a source of electrical energy to said coil and may be disconnected from said shaft to permit a tube to be passed over said shaft, means whereby the contact means at the entering side of said shaft is normally ineffective so as to permit a tube to pass, means whereby the contact means at the leaving end of said shaft is normally effective to energize said coil, and means whereby said second named contact means is rendered ineffective by the approach of a tested tube to permit said tube to pass out of said device.

3. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means, means whereby each of said current supply means may be connected to said shaft for supplying current from a source of electrical energy to said coil and may be disconnected from said shaft to permit a tube to be passed over said shaft, means whereby the contact means at the entering side of said shaft is normally ineffective so as to permit a tube to pass, means whereby the contact means at the leaving end of said shaft is normally effective to energize said coil, means whereby said second named contact means is rendered ineffective by the approach of a tested tube to permit said tube to pass out of said device, and means whereby said first named contact means is rendered effective when said second named contact means is rendered ineffective.

4. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means, means whereby each of said contact means may be connected to said shaft for supplying current from a source of electrical energy to said coil and may be disconnected from said shaft to permit a tube to be passed over said shaft, means whereby the contact means at the entering side of said shaft is normally ineffective so as to permit a tube to pass, means whereby the contact means at the leaving end of said shaft is normally effective to energize said coil, means whereby said second named contact means is rendered ineffective by the approach of a tested tube to permit said tube to pass out of said device, means whereby said first named contact means is rendered effective when said second named contact means is rendered ineffective, and means whereby said second named contact means is again rendered effective and said first named contact means is rendered ineffective when the tested tube has passed out of said device.

5. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means including current clamps, means whereby each of said clamps may be connected to said shaft for supplying current from a source of electrical energy to said coil and may be disconnected from said shaft to permit a tube to be passed over said shaft, and means whereby certain of said clamps are rendered ineffective so as to disengage said shaft and permit a tube to be passed over said shaft.

6. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means including current clamps, means whereby each of said clamps may be connected to said shaft for supplying current from a source of electrical energy to said coil and may be disconnected from said shaft to permit a tube to be passed over said shaft, means whereby the clamp at the entering side of said shaft is normally open so as to permit a tube to pass, means whereby the clamp at the leaving end of said shaft is normally closed to engage said shaft and energize said coil, and means whereby said second clamp is opened by the approach of a tested tube to permit said tube to pass out of said device.

7. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means, means whereby each of said contact means may be connected to said shaft for supplying current from a source of electrical energy to said coil and may be disconnected from said shaft to permit a tube to be passed over said shaft, means whereby the contact means at the entering side of said shaft is normally ineffective so as to permit a tube to pass, means whereby the contact means at the leaving end of said shaft is normally effective to energize said coil, means whereby said second named contact means is rendered ineffective by the approach of a tested tube to permit said tube to pass out of said device, means for feeding each tube to the testing position, a second means for feeding each tested tube out of said device, and means rendered effective by the approach of the tested tube to said second-named contact means for increasing the speed of said second feeding means.

8. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means, means whereby each of said contact means may be connected to said shaft for supplying current to said coil and may be disconnected from said shaft to permit a tube to be passed over said shaft, means whereby the contact means at the entering side of said shaft is normally ineffective so as to permit a tube to pass, means whereby the contact means at the leaving end of said shaft is normally effective to energize said coil, means whereby said second named contact means is rendered ineffective by the approach of a tested tube to permit said tube to pass out of said device, means whereby said first named contact means is rendered effective when said second named contact means is rendered ineffective, means for feeding each tube to the testing position, a second means for feeding each tested tube out of said device, and means rendered effective when said second named contact means is rendered ineffective for increasing the speed of said second feeding means.

9. In a device for testing tubes by means of an energizing coil inserted in the interior of the tube and detector means cooperating with the tube, means whereby tubes may be passed continuously over said coil in a single direction, said means comprising a shaft for supporting said coil, a plurality of current contact means, means whereby each of said contact means may be connected to said shaft for supplying current to said coil and may be disconnected from said shaft to permit a tube to be passed over said shaft, means whereby the contact means at the entering side of said shaft is normally ineffective so as to permit a tube to pass, means whereby the contact means at the leaving end of said shaft is normally effective to energize said coil, means whereby said second named contact means is rendered ineffective by the approach of a tested tube to permit said tube to pass out of said device, means whereby said first named contact means is rendered effective when said second named contact means is rendered ineffective, means whereby said second named contact means is again rendered effective and said first named contact means is rendered ineffective when the tested tube has passed out of said device, means for feeding each tube to the testing position, a second means for feeding each tested tube out of said device, and means rendered effective when said second named contact means is rendered ineffective for increasing the speed of said second feeding means.

HARCOURT C. DRAKE.